United States Patent
Zhao et al.

(10) Patent No.: US 7,666,287 B2
(45) Date of Patent: Feb. 23, 2010

(54) METHOD FOR PREPARING AN ELECTROKINETIC ELEMENT

(75) Inventors: Mingqi Zhao, San Jose, CA (US); Mark Huang, Pleasanton, CA (US); Stan Thomas, Palo Alto, CA (US); Peter Krulevitch, Pleasanton, CA (US)

(73) Assignee: Lifescan, Inc., Milpitas, CA (US)

(*) Notice: Subject to any disclaimer, the term of this patent is extended or adjusted under 35 U.S.C. 154(b) by 595 days.

(21) Appl. No.: 11/614,517

(22) Filed: Dec. 21, 2006

(65) Prior Publication Data

US 2008/0149268 A1    Jun. 26, 2008

(51) Int. Cl.
*G01N 27/27* (2006.01)

(52) U.S. Cl. .................. 204/600; 156/242; 156/250; 156/299; 156/60; 156/219; 427/58; 29/888.02; 204/450; 417/48; 137/803

(58) Field of Classification Search .............. 156/242, 156/250, 299, 60, 219; 427/58; 29/888.02; 204/600, 450; 417/48; 137/803
See application file for complete search history.

(56) References Cited

U.S. PATENT DOCUMENTS

2004/0011648 A1* 1/2004 Paul et al. .................. 204/450
2005/0247558 A1* 11/2005 Anex et al. ............... 204/275.1

* cited by examiner

*Primary Examiner*—Jeff Aftergut
*Assistant Examiner*—Jaeyun Lee (57) ABSTRACT

A method for preparing an electrokinetic element is provided and generally includes providing a porous membrane adapted for use in an electrokinetic pump and encapsulating the porous membrane within a polymer substrate to yield an electrokinetic element base member having the porous membrane encapsulated by the polymer. In one embodiment, the method can include laminating the porous membrane between opposed sheets of a polymer before the step of encapsulating. The method can also include cutting the electrokinetic element base member into a plurality of slices and assembling an electrokinetic infusion pump by inserting a slice into a chamber of the pump.

18 Claims, 7 Drawing Sheets

METHOD FOR PREPARING AN ELECTROKINETIC ELEMENT

FIELD OF THE INVENTION

The present invention relates to methods for preparing an electrokinetic element for use in an infusion pump.

BACKGROUND OF THE INVENTION

Electrokinetic pumps provide for liquid displacement by applying an electric potential across a porous dielectric media that is filled with an ion-containing electrokinetic solution. Properties of the porous dielectric media and ion-containing solution (e.g., permittivity of the ion-containing solution and zeta potential of the solid-liquid interface between the porous dielectric media and the ion-containing solution) are predetermined such that an electrical double-layer is formed at the solid-liquid interface. Thereafter, ions of the electrokinetic solution within the electrical double-layer migrate in response to the electric potential, transporting the bulk electrokinetic solution with them via viscous interaction. The resulting electrokinetic flow (also known as electroosmotic flow) of the bulk electrokinetic solution is employed to displace (i.e., "pump") a liquid.

The electrokinetic element, which generally includes the porous dielectric media or electrokinetic material laminated in a polymer, is a key component of the electrokinetic pump. The electrokinetic element is bonded within a chamber of the pump and separates the pump body into two chambers. If the electrokinetic material is charged, pressure and fluid flow can be generated by applying a voltage at the two sides of the electrokinetic element. It is critical to the operation of the electrokinetic pump that the electrokinetic solution flow through the electrokinetic element without leaking around the exterior of the electrokinetic element or between the electrokinetic material and the laminate. One known approach to making the electrokinetic element is by laminating electrokinetic material between two pieces of plastic using a temperature sensitive adhesive. There are various drawbacks to this technique. For example, the adhesive often flows into the inlet and outlet ports of the electrokinetic element and must be manually removed. In addition, several layers of adhesive must be used, increasing the complexity and cost of the process. The quality of the adhesive bond also depends on time, temperature, pressure, and geometry, making the lamination process difficult to control.

Accordingly, there is a need for improved methods for preparing an electrokinetic element.

SUMMARY OF THE INVENTION

One exemplary embodiment is directed to a method for preparing an electrokinetic element including providing a porous membrane adapted for use in an electrokinetic pump and encapsulating the porous membrane within a polymer substrate to yield an electrokinetic element base member having the porous membrane encapsulated by the polymer. The porous membrane can be in sheet form and can be formed from a variety of materials including, for example, polyvinylidene fluoride (PVDF), nylons, polytetrafluoroethylene (PTFE), polyethylene terephthalate (PET), polyether sulfone, polysulfone, polystryrene, polyetherimide, polyolefins, and porous silica. Encapsulating the porous membrane within the polymer substrate can be accomplished using a variety of techniques. For example, encapsulating can include co-extruding the porous membrane with the polymer, casting the porous membrane within the polymer, and using injection molding to encapsulate the membrane. Several polymers can be used to encapsulate the porous membrane such as polyethylene, polypropylene, polystyrene, polyethylene vinyl acetate, polyethylene ethyl acetate, ionomers, polyamides, polyesters, and polyurethanes.

In another exemplary embodiment, the method can include laminating the porous membrane between opposed sheets of a polymer before the step of encapsulating. An adhesive material such as a temperature sensitive adhesive, pressure sensitive adhesive, or UV curable adhesive can be applied between the porous membrane and the opposed polymer sheets during lamination to encourage adhesion between the porous membrane and the laminate. Laminating the porous membrane and encapsulating the laminated membrane within a polymer can be performed as discrete steps or as a continuous process.

The method can also include cutting the electrokinetic element base member into a plurality of slices. Each slice can include a porous membrane surrounded by a polymer wherein the porous membrane extends from a first surface of the slice to a second surface of the slice. The slices can have a variety of shapes and sizes but, in an exemplary embodiment, the slices can have a thickness in the range of about 1-10 mm and a diameter in the range of about 3-15 mm. The method can further include assembling an electrokinetic infusion pump by inserting a slice into a chamber of the pump.

BRIEF DESCRIPTION OF THE DRAWINGS

The invention will be more fully understood from the following detailed description taken in conjunction with the accompanying drawings, in which.

DETAILED DESCRIPTION OF THE INVENTION

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

The features disclosed herein are applicable to a variety of electrokinetic infusion pump systems. For example, the methods disclosed herein can be used in the manufacture of electrokinetic infusion pumps and electrokinetic infusion pump systems of the type disclosed in U.S. patent application Ser. No. 11/532,587, filed Sep. 18, 2006, entitled "Electrokinetic Infusion Pump System," which is incorporated herein in its entirety. Such electrokinetic infusion pumps may include additional features such as error, malfunction, and position sensor detection systems including those disclosed in U.S. patent application Ser. No. 11/532,691, filed Sep. 18, 2006, entitled "Malfunction Detection With Derivative Calculation," and U.S. patent application Ser. No. 11/614,211, filed Dec. 21, 2006, entitled "Malfunction Detection In Infusion Pumps," both of which are likewise incorporated herein in their entirety.

Figure 1:
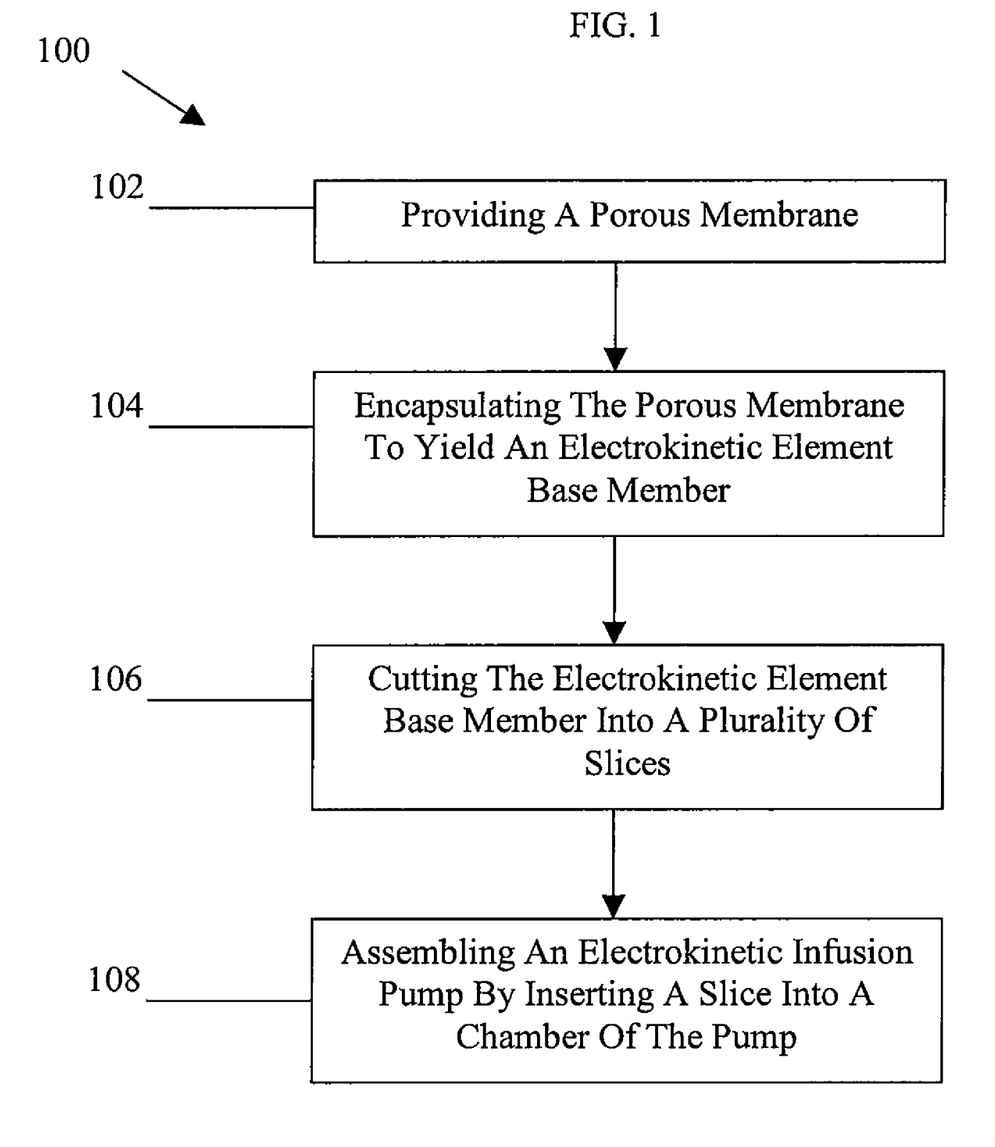
FIG. 1 is a flow diagram of one embodiment of a method for preparing an electrokinetic element.

FIG. 1 is a flow diagram illustrating an exemplary embodiment of a method for preparing an electrokinetic element 100. Generally, the method 100 can include providing a porous membrane 102 adapted for use in an electrokinetic pump and encapsulating the porous membrane 104 within a polymer substrate to yield an electrokinetic element base member having the porous membrane encapsulated by the polymer.

Various porous materials can be used in conjunction with the method, and the porous material can be selected for desired surface chemistry, surface charge, pore size, pore topology, and formation factor. The pore geometry of the material can be chosen with the design of the flow system in mind, in particular, whether fluid flow will be normal to the plane of the material or in the plane of the material along its length. Porous materials suitable for use with the method include, for example, polyvinylidene fluoride (PVDF), nylons, polytetrafluoroethylene (PTFE), polyethylene terephthalate (PET), polyether sulfone, polysulfone, polystryrene, polyetherimide, polyolefins, and porous silica. The porous material is preferably in the form of a membrane sheet or film having a thickness appropriate for encapsulation, for example, approximately 50-250 microns.

As shown in FIG. 1, once the appropriate porous membrane is selected, the membrane can be encapsulated within a polymer substrate to yield an electrokinetic element base member 104 having the porous membrane encapsulated by the polymer. The porous membrane can be encapsulated within a wide variety of polymers including, for example, polyethylene, polypropylene, polystyrene, polyethylene vinyl acetate, polyethylene ethyl acetate, ionomers, polyamides, polyesters, and polyurethanes. The polymer can be selected to be mechanically and chemically compatible with both the porous material and the encapsulation process. For example, the polymer should be non-conductive and in a stable chemical state.

A variety of techniques are available for encapsulating the porous membrane within the selected polymer. For example, encapsulating the porous membrane can include casting the porous membrane within the polymer or using injection molding to form the electrokinetic element base member having the porous membrane surrounded by the polymer. In yet another exemplary embodiment, encapsulating the porous membrane can include co-extruding the porous membrane with the polymer. As is known in the art, co-extrusion involves extruding two or more materials through a single die with two or more orifices arranged so that the extrudates merge and weld together into a laminar structure before cooling. For example, in one embodiment, a 1 inch Davis Standard single screw extruder with a crosshead die can be used to co-extrude the porous membrane with the polymer. The co-extrusion process can yield electrokinetic element base members of various shapes and sizes including, for example, a block or a cylindrical rod having a diameter in the range of about 3-15 mm. One advantage of co-extrusion is that each extrudate can impart a desired characteristic property, such as stiffness, heat-sealability, impermeability or resistance to some environmental conditions. Another advantage of co-extrusion is that the parameters of the co-extrusion process can be varied to modify the properties of the porous membrane. For example, increasing the extrusion pressure can be effective to increase the psi/V value of the porous membrane.

The method is generally described as encapsulating a single porous membrane within a polymer. However, one skilled in the art will appreciate that multiple membranes can be encapsulated within a single polymer substrate to create an electrokinetic element base member that includes several layers of porous material. Such a configuration can be effective to increase the flow rate through the resulting electrokinetic element. Additionally, regardless of the number of porous membranes disposed within a single polymer substrate and the technique used to encapsulate the membrane(s), the membrane(s) are preferably oriented parallel to the axis of the electrokinetic element base member to facilitate fluid flow through the electrokinetic infusion pump.

Figure 5:
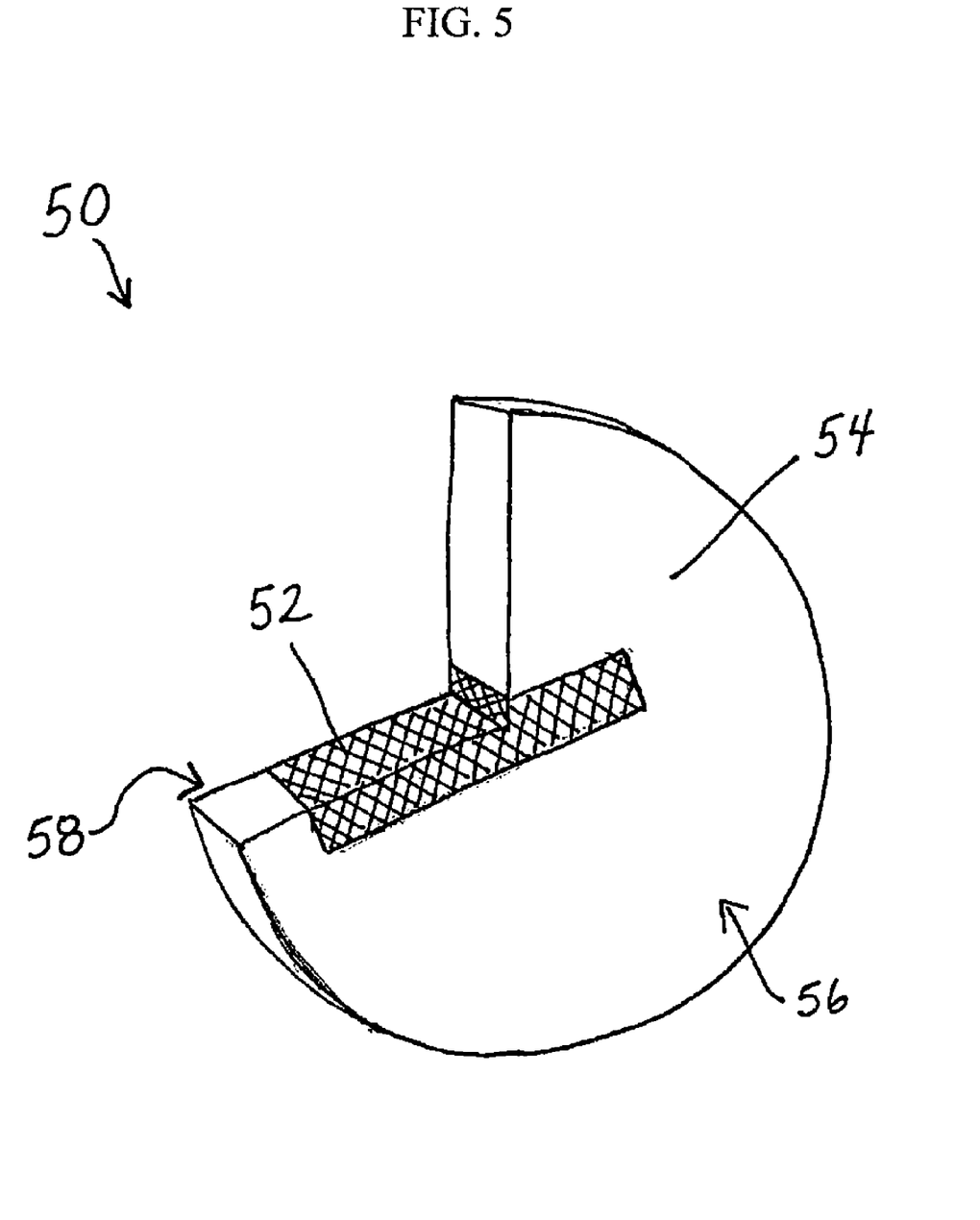
FIG. 5 is a perspective cross-sectional view of a slice of an electrokinetic element base member prepared in accordance with one embodiment of the invention.

Referring back to FIG. 1, the method 100 can also include cutting the electrokinetic element base member into a plurality of slices 106, which can, for example, be disk-like in shape. As shown in FIG. 5, each slice 50 can include a porous membrane 52 surrounded by the polymer 54 such that the porous membrane extends from a first surface 56 of the slice 50 to a second surface 58 of the slice 50. A variety of machining techniques known in the art, such as a high speed flying wheel cutter, can be used to cut the electrokinetic element base member into slices. In an exemplary embodiment, the slices can have a thickness in the range of about 1-10 mm. As indicated in FIG. 1, once the electrokinetic element base member is cut into a plurality of slices 106, the electrokinetic infusion pump can be assembled by inserting a slice into a chamber of the pump 108.

Figure 2:
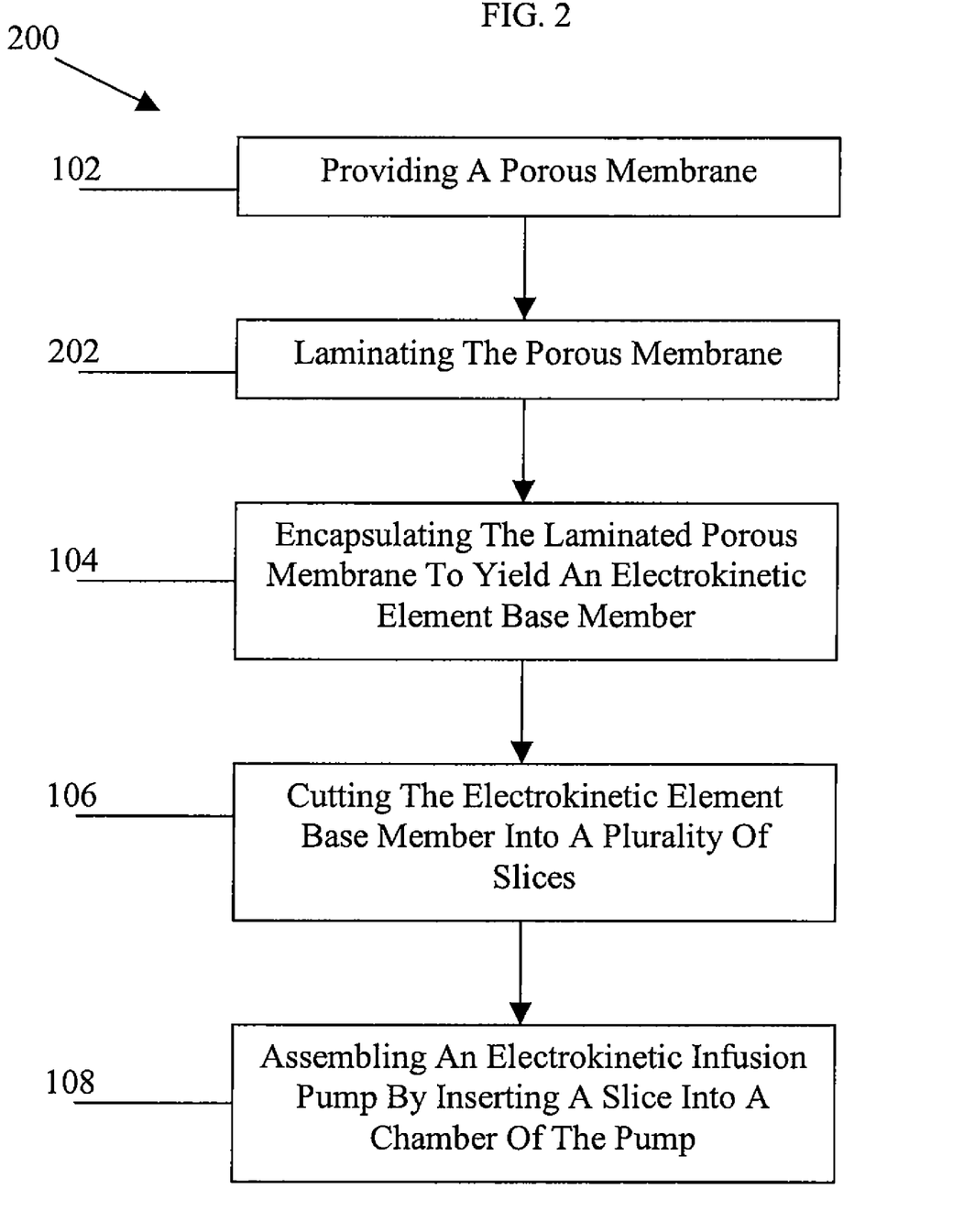
FIG. 2 is a flow diagram of another embodiment of a method for preparing an electrokinetic element.

FIG. 2 illustrates another exemplary embodiment of a method for preparing an electrokinetic element 200. In this embodiment, the porous membrane can be laminated between opposed sheets of a polymer 202 before it is encapsulated 104, such as by a process of the type described above. Laminating the porous membrane 202 prior to encapsulating 104 can provide several advantages, including preventing the blocking of the nanopores in the membrane and improving the mechanical strength of the membrane in the proceeding encapsulation 104 and cutting 106 steps. In particular, the lamination process can reinforce the membrane to prevent the pores from collapsing during the encapsulation process.

Figure 3:
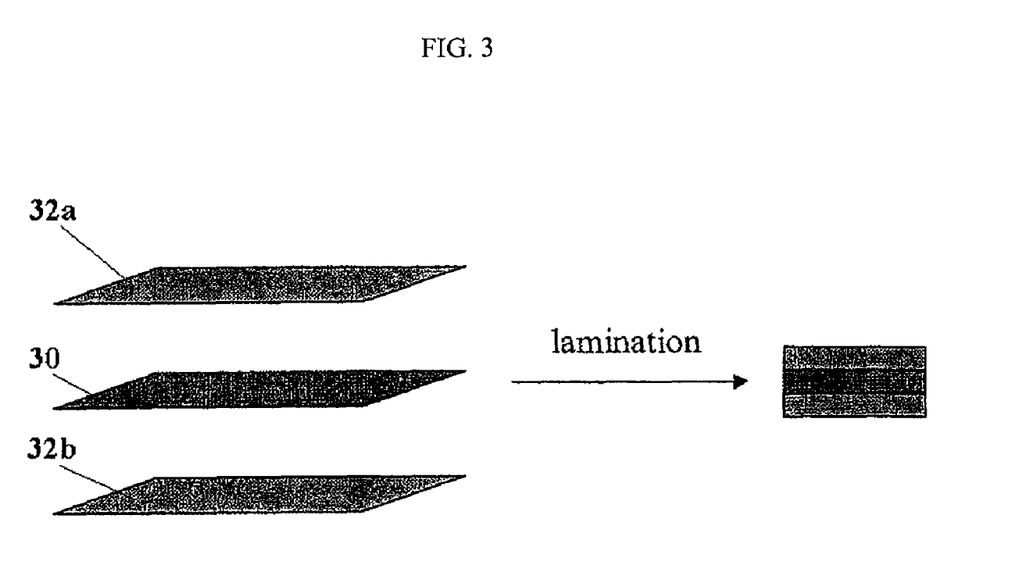
FIG. 3 is a schematic diagram of a porous membrane being laminated between top and bottom lamination films.
Figure 4:
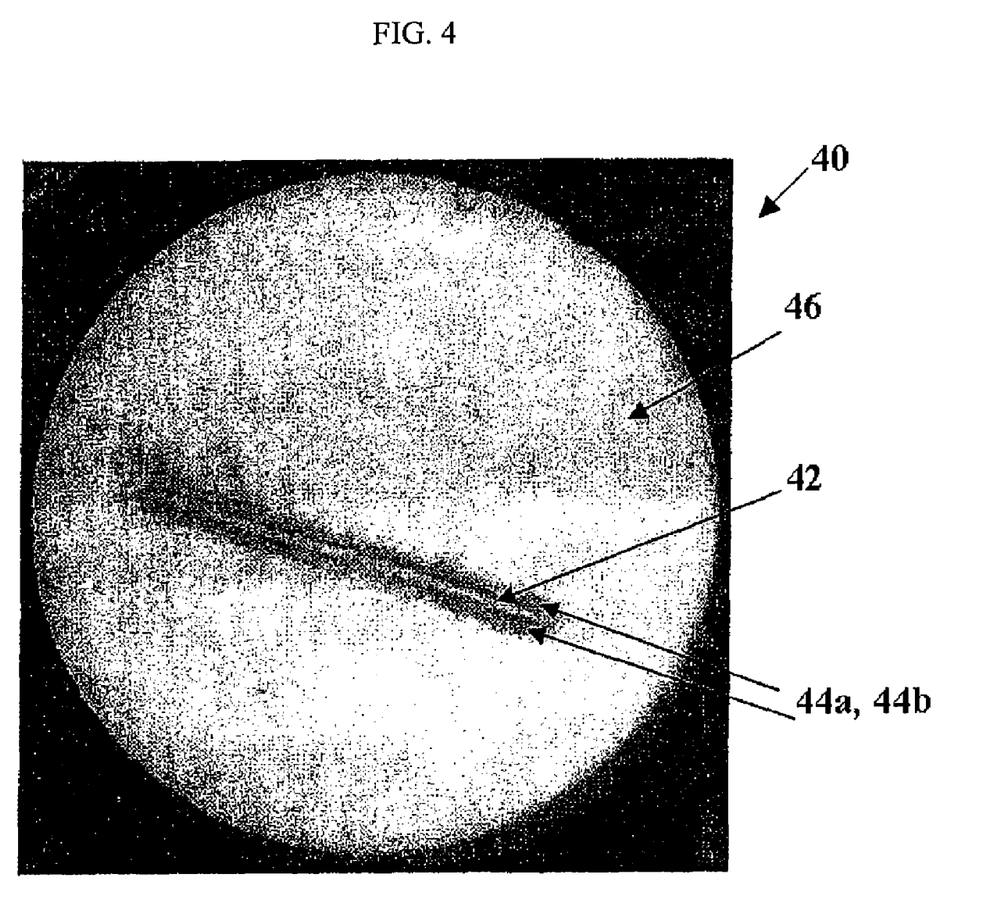
FIG. 4 is an electrokinetic element prepared in accordance with one embodiment of the invention.

As shown in FIG. 3, the porous membrane 30 can be laminated between top and bottom lamination films 32a, 32b such that the membrane is sealed and protected during the subsequent encapsulating and cutting processes. A variety of polymers can be used to laminate the porous membrane including, for example, polyethylene, polypropylene, polystyrene, polyethylene vinyl acetate, polyethylene ethyl acetate, ionomers, polyamides, polyesters, and polyurethanes. In an exemplary embodiment, an adhesive material such as a temperature sensitive adhesive, pressure sensitive adhesive, or UV curable adhesive can be applied between the porous membrane and the opposed polymer sheets during lamination to encourage adhesion between the porous membrane and the laminate. FIG. 4 shows an exemplary electrokinetic element 40 that was prepared in accordance with the method disclosed herein and includes a negatively charged porous polyvinylidene fluoride (PVDF) membrane 42 that is laminated between two adhesive films 44a, 44b and encapsulated in polyurethane 46 through casting.

In another exemplary embodiment, a PVDF membrane was laminated, as described above, between opposed sheets of PET with an adhesive material, such as 3M's ThermalBond 615 and 620 adhesive, applied between the membrane and the PET films. The laminated membrane was then slit to a 4 mm width and collected on a metal roll for extrusion. The laminate roll was fed through an 1.5 inch single screw extruder by Davis Standard having a crosshead die. As the laminate traveled perpendicular to the polymer substrate, a vacuum (>20 in Hg) was applied at the feeding section to remove any air entrapped in the membrane. In this example, the polymer substrate was an EVA polymer from DuPont that has a melt temperature in the range of 250 to 300° F. The polymer was melted by the extruder at a temperature profile of 245/250/255/260/265/270° F. in six sections from feeding to the die head, and the extrusion pressure varied by extrusion speed and polymer melt temperature in the range of 200 to 800 psi. As the encapsulated laminate exited the crosshead die, it was cooled by a water tank to obtain the desired dimension. At the end of the water tank, a belt puller was used to adjust the line speed and to control the diameter of the encapsulated laminate. The encapsulated laminate was then stored for at least 24 hours for stress relaxation before machining. Disks or slices having a thickness of about 3 mm were then cut and tested for performance. The following tables include the results of the performance tests:

| EVA 11E573 VVLP 4 LAYERS | Disk 1 | Disk 2 | Disk 3 | Disk 4 | Disk 5 |
|---|---|---|---|---|---|
| Pressure Driven Flow (15 psi) uL/min | 1.35 | 1.66 | 1.88 | 1.55 | 1.82 |
| Voltage Driven Flow (50 V) uL/min | 6.95 | 9.16 | 9.07 | 8.08 | 8.71 |
| Current uA | 144.41 | 173.96 | 176.62 | 154.23 | 172.05 |
| Psi/Volt | 1.03 | 1.10 | 0.96 | 1.04 | 0.96 |
| Zeta Potential | 28.53 | 31.22 | 30.43 | 31.07 | 30.01 |
| Disk thickness (mm) | 3 | 3 | 3 | 3 | 3 |

| EVA 11E573 VVLP 2 LAYERS | Disk 1 | Disk 2 | Disk 3 | Disk 4 | Disk 5 |
|---|---|---|---|---|---|
| Pressure Driven Flow (15 psi) uL/min | 0.61 | 0.74 | 0.72 | 0.71 | 0.65 |
| Voltage Driven Flow (50 V) uL/min | 3.32 | 3.73 | 3.44 | 3.47 | 3.62 |
| Current uA | 64.16 | 87.40 | 72.14 | 68.22 | 69.61 |
| Psi/Volt | 1.10 | 1.01 | 0.96 | 0.98 | 1.11 |
| Zeta Potential | 30.71 | 25.30 | 28.24 | 30.16 | 30.86 |
| Disk thickness (mm) | 3 | 3 | 3 | 3 | 3 |

Figure 6A:
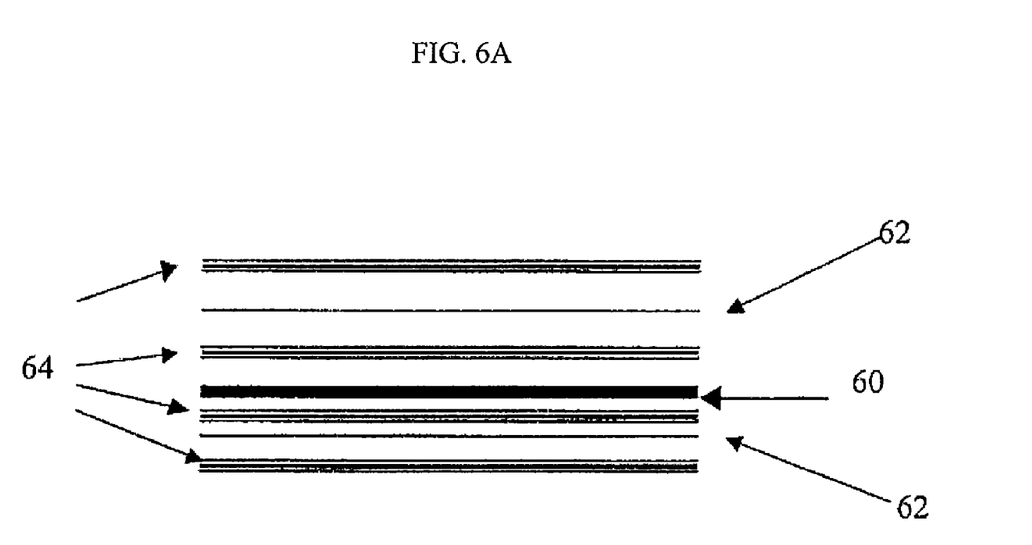
FIG. 6A is a schematic diagram of a laminated porous membrane prepared in accordance with one embodiment of the invention.
Figure 6B:
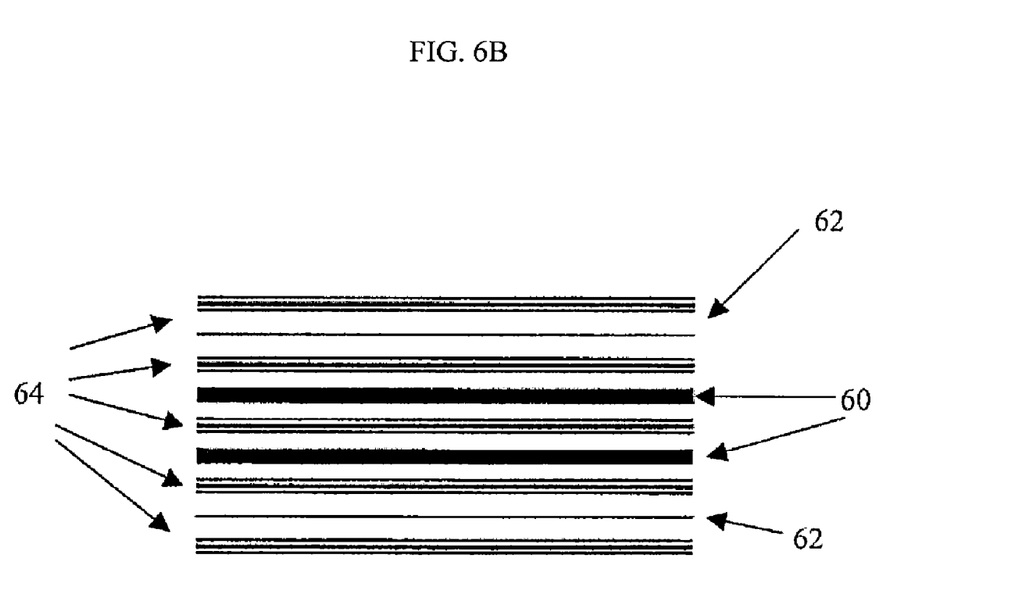
FIG. 6B is a schematic diagram of multiple porous membranes laminated in accordance with one embodiment of the invention.
Figure 6C:
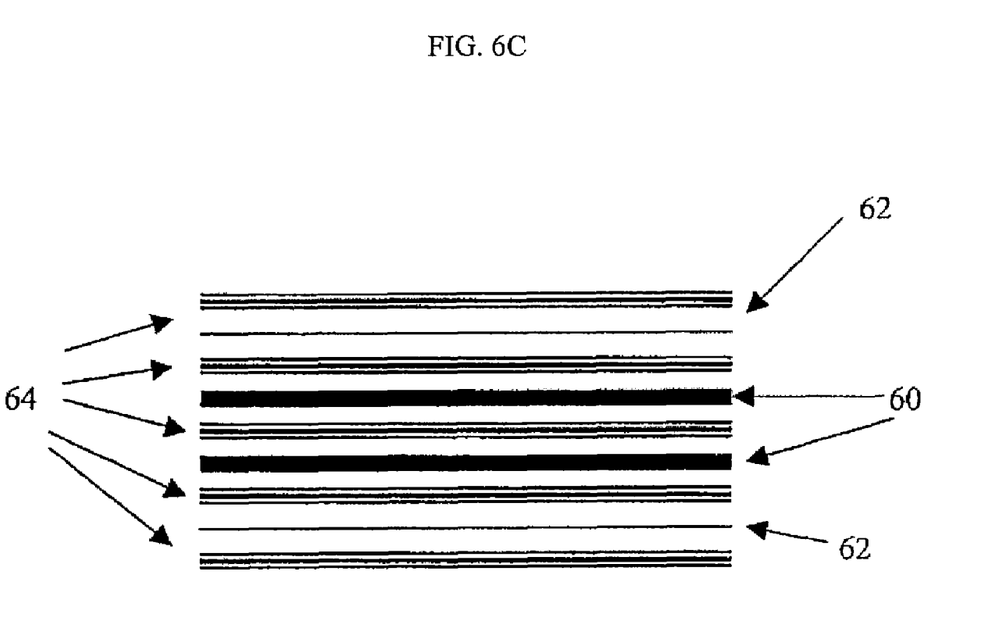
FIG. 6C is a schematic diagram of multiple porous membranes laminated in accordance with another embodiment of the invention.

As indicated above, although the method is generally described as laminating a single porous membrane and encapsulating that laminated membrane within a polymer, one skilled in the art will appreciate that multiple membranes can laminated and encapsulated within a single polymer substrate to create an electrokinetic element base member that includes several layers of porous material. Various exemplary embodiments of laminated membranes are shown in FIGS. 6A-6C. FIG. 6A illustrates a single porous membrane 60 that is laminated between opposed sheets of lamination film 62 and has a sealing adhesive 64 applied thereto. FIG. 6B shows two layers of porous membrane 60 laminated between opposed sheets of lamination film 62. In this embodiment, the sealing adhesive 64 is applied between the layers of porous membrane 60 as well as between the porous membrane 60 and the lamination films 62. A third exemplary embodiment is shown in FIG. 6C and includes four layers of porous membrane 60 with sealing adhesive 64 applied between each layer of membrane 60 and a lamination film 62 isolating the top two membranes from the bottom two membranes. One skilled in the art will appreciate that the embodiments shown in FIGS. 6A-6C are just three of any number of combinations available for layering multiple membranes.

A person skilled in the art will also appreciate that the steps of laminating the porous membrane 202 and encapsulating the laminated membrane 104 can be performed as discrete steps or as a continuous process. This concept is not limited to the lamination and encapsulation steps, as the entire method for preparing the electrokinetic element can be performed as a continuous process or as a series of discrete steps.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method for preparing an electrokinetic element, comprising:
providing a porous membrane adapted for use in an electrokinetic pump;
encapsulating the porous membrane within a polymer substrate to yield an electrokinetic element base member having the porous membrane encapsulated by the polymer, and; cutting the electrokinetic element base member into a plurality of slices.

2. The method of claim 1, wherein each slice having a porous membrane surrounded by a polymer, the porous membrane extending from a first surface of the slice to a second surface of the slice.

3. The method of claim 2, further comprising assembling an electrokinetic infusion pump by inserting the slice into a chamber of the pump.

4. The method of claim 1, comprising laminating the porous membrane between opposed sheets of a polymer before the step of encapsulating.

5. The method of claim 4, wherein laminating the porous membrane and encapsulating the porous the membrane within a polymer is performed as a continuous process.

6. The method of claim 4, wherein an adhesive material selected from the group consisting of a temperature sensitive adhesive, pressure sensitive adhesive, and UV curable adhesive is applied between the porous membrane and the opposed sheets during lamination.

7. The method of claim 1, wherein more than one porous membrane is encapsulated within a single polymer substrate to yield an electrokinetic element base member having multiple layers of porous material.

8. The method of claim 1, wherein encapsulating the porous membrane comprises co-extruding the porous membrane with the polymer.

9. The method of claim 1, wherein encapsulating the porous membrane comprises casting the porous membrane within the polymer.

10. The method of claim 1, wherein encapsulating the porous membrane comprises using injection molding to form the electrokinetic element base member having the porous membrane surrounded by the polymer.

11. The method of claim 1, wherein the porous membrane is in sheet form.

12. The method of claim 2, wherein the slice has a thickness in the range of about 1-10 mm.

13. The method of claim 2, wherein the slice has a diameter in the range of about 3-15 mm.

14. The method of claim 1, wherein the polymer is selected from the group consisting of polyethylene, polypropylene, polystyrene, polyethylene vinyl acetate, polyethylene ethyl acetate, ionomers, polyamides, polyesters, and polyurethanes.

15. The method of claim 1, wherein the porous membrane is made from a material selected from the group consisting of polyvinylidene fluoride (PVDF), nylons, polytetrafluoroethylene (PTFE), polyethylene terephthalate (PET), polyether sulfone, polysulfone, polystryrene, polyetherimide, polyolefins, and porous silica.

16. A method for fabricating an electrokinetic element, comprising:
   providing a porous membrane;
   laminating the porous membrane between top and bottom lamination films such that the porous membrane is sealed within the lamination films; and
   encapturing the laminated porous membrane with a polymer to yield an electrokinetic element base member having the porous membrane surrounded by the polymer;
   wherein laminating the porous membrane and encapturing the laminated membrane within a polymer substrate is performed as a continuous process.

17. The method of claim 16, further comprising cutting the electrokinetic element base member into one or more slices.

18. The method of claim 17, further comprising assembling an electrokinetic infusion pump by inserting the slice into a chamber of the pump.

* * * * *